United States Patent [19]
Lehmann et al.

[11] 4,319,019
[45] Mar. 9, 1982

[54] POLYAMINES CONTAINING AMIDE GROUPS

[75] Inventors: Wolfgang Lehmann, Leverkusen; Friedhelm Müller, Odenthal; Günther Cramn; Knut Hammerström, both of Cologne; Wilfried Löbach, Bonn, all of Fed. Rep. of Germany

[73] Assignee: Bayer Aktiengesellschaft, Leverkusen, Fed. Rep. of Germany

[21] Appl. No.: 167,879

[22] Filed: Jul. 14, 1980

Related U.S. Application Data

[62] Division of Ser. No. 969,822, Dec. 15, 1978, Pat. No. 4,250,299.

[30] Foreign Application Priority Data

Dec. 17, 1977 [DE] Fed. Rep. of Germany ....... 2756431

[51] Int. Cl.³ .............................................. C08G 69/48
[52] U.S. Cl. ............................ 528/324; 162/164 EP; 525/420; 528/310; 528/321; 528/326; 528/337; 528/340; 528/341; 528/346; 528/422; 524/608
[58] Field of Search ............... 528/324, 310, 323, 397, 528/422; 525/420

[56] References Cited

U.S. PATENT DOCUMENTS

| 3,306,875 | 2/1967 | Hay ..................................... 528/215 |
| 3,640,840 | 2/1972 | Zieman et al. ...................... 528/334 |
| 3,642,572 | 2/1972 | Endres et al. ....................... 528/334 |

FOREIGN PATENT DOCUMENTS 1035296 7/1966 United Kingdom .
1147984 4/1969 United Kingdom .

Primary Examiner—Harold D. Anderson
Attorney, Agent, or Firm—Sprung, Felfe, Horn, Lynch & Kramer

[57] ABSTRACT

Water-soluble polyamines which are obtainable by reacting (A) one or more water-soluble or water-dispersible basic polyamides which have been prepared by condensation of aliphatic polyamines containing at least two primary amino groups and at least one secondary or tertiary amino group, or of mixtures of these polyamines and of aliphatic, cycloaliphatic, araliphatic or heterocyclic polyamines containing two primary or two secondary amino groups or one primary and one secondary amino group, with saturated aliphatic dicarboxylic acids containing 4–10 carbon atoms, or with functional derivatives thereof and optionally with ω-aminocarboxylic acids containing at least 3 carbon atoms, or lactams thereof, (B) one or more polyalkylenepolyamines of the general formula

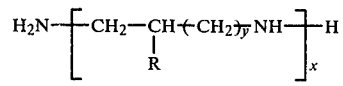

in which
R denotes H or CH₃,
y is in each case the same or different and denotes the number 0 or 1 and
x denotes a number from 4 to 2,500, or mixtures of these polyalkylenepolyamines with amines of the same general formula, but in which
X denotes a number from 1 to 3, and (C) compounds which are polyfunctional towards amino groups, are suitable as agents for increasing the retention of fibres, fillers and pigments, for accelerating drainage during the production of paper and for working up effluents from paper machines.

12 Claims, No Drawings

POLYAMINES CONTAINING AMIDE GROUPS

This is a division of application Ser. No. 969,822, filed Dec. 15, 1978 now U.S. Pat. No. 4,250,299.

The invention relates to water-soluble polyamines which are obtainable by reacting (A) one or more water-soluble or water-dispersible basic polyamides which have been prepared by condensation of aliphatic polyamines containing at least two primary amino groups and at least one secondary or tertiary amino group, or of mixtures of these polyamines and of aliphatic, cycloaliphatic, araliphatic or heterocyclic polyamines containing two primary or two secondary amino groups or one primary and one secondary amino group, with saturated aliphatic dicarboxylic acids containing 4–10 carbon atoms, or with functional derivatives thereof and optionally with ω-aminocarboxylic acids containing at least 3 carbon atoms, or lactams thereof, (B) one or more polyalkylenepolyamines of the general formula

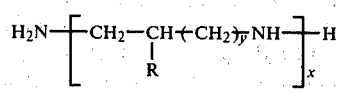

in which
R denotes H or CH$_3$,
y is in each case the same of different and denotes the number 0 or 1 and
x denotes a number from 4 to 2,500, or mixtures of these polyalkylenepolyamines with amines of the same general formula, but in which
x denotes a number from 1 to 3, and (C) compounds which are polyfunctional towards amino groups.

The invention furthermore relates to a process for the preparation of these water-soluble polyamines and their use as agents for increasing the retention of fibres, fillers and pigments and for accelerating drainage during the production of paper, and for working up effluents from paper machines by filtration, sedimentation and flotation.

Both higher-molecular basic polyamides, that is to say polyamides with an average molecular weight of more than 10,000, and, advantageously, low-molecular basic polyamides with an average molecular weight of less than 10,000, in particular less than 5,000, can be used for the preparation of the water-soluble polyamines according to the invention.

Possible water-soluble or dispersible basic polyamides A are, in particular:

(a) reaction products of saturated aliphatic C$_4$–C$_{10}$ dicarboxylic acids, such as succinic acid, glutaric acid, adipic acid, diglycollic acid or sebacic acid, or functional derivatives thereof, such as anhydrides and esters, with aliphatic polyamines which contain at least 2 primary amino groups and at least one secondary or tertiary amino group; examples of such amines are methyl-bis-(3-amino-propyl)-amine, ethyl-bis-(3-amino-propyl)-amine, 2-hydroxyethyl-bis-(3-amino-propyl)-amine, N-(3-amino-propyl)-tetramethylenediamine and N,N'-bis-(3-amino-propyl)-tetramethylenediamine, 3-(2-amino-ethyl)-aminopropylamine, N,N'-bis-(3-aminopropyl)-ethylenediamine and 4,7,11,-triazatetradecane-1,14-diamine, but in particular polyalkylenepolyamines of the formula

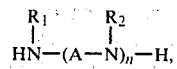

in which
A denotes a C$_2$–C$_8$-alkylene radical,
R$_1$ and R$_2$ independently of one another denote hydrogen or a C$_1$–C$_{10}$-alkyl radical which is optionally substituted by a hydroxyl or amino group and
n denotes a number from 2–15,
such as di-propylene-(1,2)-triamine, bis-(3-aminopropyl)-amine, tri-propylene-(1,2)-tetramine and, above all, diethylenetriamine, triethylenetetramine and all other polyethylenepolyamines of the abovementioned formula in which R$_1$ and R$_2$=H, A=CH$_2$CH$_2$ and n=5–15, and especially mixtures thereof, and above all the reaction products of 1 mol of 1,2-dichloroethane with 4 to 40 mols of ammonia, which have been freed from ethylenediamine, and if necessary also from diethylenetriamine and triethylenetetramine, by distillation (Houben-Weyl, 4th edition, XI/1, page 43 and 44).

Further water-soluble basic polyamides which may be mentioned are:

(b) those reaction products which, in addition to being based on the polyamines listed under (a), are also based on aliphatic, cycloaliphatic, araliphatic or heterocyclic polyamines containing 2 primary or 2 secondary amino groups or one primary and one secondary amino group, such as ethylenediamine, N-(2-hydroxy-ethyl-)-ethylenediamine, N,N'-dimethyl-ethylenediamine, 1,2-diamino-propane, 1,6-diamino-hexane, 1,4-diamino-cyclohexane, 1,3-bis-aminomethylbenzene and piperazine, and in addition to being based on the abovementioned saturated aliphatic C$_4$–C$_{10}$-dicarboxylic acids, are also based on unsaturated dicarboxylic acids, such as maleic acid or fumaric acid, or also on ε-aminocarboxylic acids or lactams thereof, for example 6-aminocaproic acid and 8-aminocaprylic acid, or 6-caprolactam and 8-capryllactam.

The basic polyamides mentioned under (a) and (b) are called "polyamide-amines" or "polyamidoamines" or "polyamide-polyamines" or "polyaminopolyamides" in the literature.

The proportions of the possible polyacidic amine and dicarboxylic acid components to be observed for the preparation of the basic polyamides mentioned under (a) can correspond to the molar proportions of 0.8 to 1.4:1 given in the literature. However, in some cases it can be advantageous to exceed the limits given, up to a ratio of about 0.8 to 2.5:1. The amount of amine in the polyamide-amines mentioned under (b), which can be prepared by also using ε-aminocarboxylic acids or lactams thereof, can likewise be increased above the amount indicated.

Basic polyamides of this type are also described, for example, as starting compounds for the reaction with polyfunctional compounds in German patent specification Nos. 1,177,824 and 1,771,814.

Furthermore, mixtures of the basic polyamides given under (a) and (b) with amines which contain amide groups and are prepared by other routes are also possible, such as, for example: reaction products of aliphatic, cycloaliphatic, araliphatic or heterocyclic polyamines which contain at least 2 primary or 2 secondary amino groups or at least one primary and one secondary amino group, such as ethylenediamine, 1,2-diamino-propane, 1-amino-3-methylamino-propane, diethylenetriamine, bis-(3-amino-propyl)-amine, 1,4-diaminocyclohexane, 1,3-bis-aminomethyl-benzene and piperazine, with $\alpha,\beta$-unsaturated carboxylic acid esters, such as acrylic acid ethyl ester and methacrylic acid methyl ester, reaction products of aliphatic polyamines which contain at least 2 primary amino groups and at least one secondary or tertiary amino group, such as diethylenetriamine, triethylenetriamine, tetraethylenepentamine, di-propylene-(1,2)-triamine, bis-(3-amino-propyl)-amine, tripropylene-(1,2)-tetramine, methyl-bis-(3-amino-propyl)-amine, ethylbis-(3-amino-propyl)-amine, 2-hydroxyethyl-bis-(3-amino-propyl)-amine, N-(3-amino-propyl)-tetramethylenediamine and N,N'-bis-(3-amino-propyl)-tetramethylene-diamine, and $\omega$-amino carboxylic acids containing at least 3 carbon atoms, or lactams thereof, for example 6-aminocaproic acid and 8-aminocaprylic acid, or 6-caprolactam and 8-capryllactam. and reaction products of the polyamines just mentioned with unsaturated dicarboxylic acids, such as maleic acid or fumaric acid, or with functional derivatives thereof, such as anhydrides or esters.

Modified basic polyamides of the abovementioned types are also possible, in particular those in which some of the secondary amino groups have been converted into tertiary amino groups by condensation or addition, for example by reaction with $\alpha,\beta$-unsaturated acids in an aqueous medium, such as vinylsulphonic acid, acrylic or methacrylic acid, maleic acid and itaconic acid, or with $\alpha,\beta$-unsaturated acid amides, such as acrylamide or methacrylamide, or 1- or 2-halogeno-fatty acids, such as chloroacetic acid and 2-propionic acid, and by grafting on 1,2-alkyleneimines or 1,2-polyalkylenepolyamines, such as is described, for example, in German Offenlegungsschrift 1,802,435, and with ethylene oxide or propylene oxide.

Polyalkylenepolyamines B of the formula given above which may be mentioned are, above all, the polyethylenepolyamines in which y represents zero, such as, for example, ethylenediamine, propylene-1,2-diamine, diethylenetriamine, dipropylenetriamine, triethylenetetramine, tripropylenetetramine, tetraethylenepentamine, tetrapropylenepentamine, pentaethylenehexamine, pentapropylenehexamine, hexaethylenehaptamine, hexapropyleneheptamine, heptaethyleneoctamine, heptapropyleneoctamine and mixtures thereof, and polyethylenepolyamines which additionally also contain one or more pyperazine rings, such as aminoethylpiperazine, pentaethylenepentamine and octaethyleneheptamine, and mixtures thereof, but in particular (a) the polyethylenepolyamine mixture which is obtained during the discontinuous (for example Houben-Weyl, 4th edition XI/1, page 44) or during the continuous (for example in British patent specification No. 1,147,984 and U.S. Patent Specification Nos. 1,832,534 and 2,049,467) reaction of 1,2-dichloroethane with aqueous ammonia, optionally in the presence of added ethylenediamine or diethylenetriamine (U.S. Pat. No. 2,769,841 and DE-OS (German Published Specification) No. 1,668,922) and which contains considerable proportions of tetraethylenepentamine, pentaethylenehexamine, hexaethylenehexamine, hexaethyleneheptamine, heptaethyleneheptamine and higher amines, and above all (b) the polyethylenepolyamine mixture which remains after distilling off ethylenediamine, and if necessary also diethylenetriamine and triethylenetetramine, from the mixture of bases prepared according to (a).

(c) the polyacidic oligomeric amines with an average molecular weight of 1,000 to 10,000, in particular 2,000 to 5,000, which can be prepared by condensation of 1,2-dichloroethane with the abovementioned polyethylenepolyamines, individually or as a mixture.

(d) the polyacidic amines with an average molecular weight of 1,000 to 10,000, in particular 2,000 to 5,000, which are obtainable by polymerisation of 1,2-alkyleneimines.

Further polyalkylenepolyamines of the abovementioned formula which may also be mentioned are:

(e) pure polypropylenepolyamines and mixtures thereof and (f) mixed polyethylenepolypropylenepolyamines and mixtures thereof, above all which are obtained by reacting ethylenediamine and propylene-1,3-diamine with acrylonitrile once or several times, with subsequent hydrogenation in each case, for example the polyacidic amines of the formula 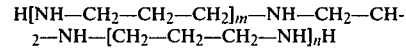 wherein x denotes an integer from 1 to 10, and those of the formula $$H[NH-CH_2-CH_2-CH_2]_m-NH-CH_2-CH_2-NH-[CH_2-CH_2-CH_2-NH]_nH$$

wherein
m denotes an integer from 1 to 5 and
n denotes an integer from 0 to 5, and also (g) the polyacidic amines with an average molecular weight of 1,000 to 10,000, in particular 2,000 to 5,000, which can be prepared by condensation of 1,2-dichloroethane with the polyalkylenepolyamines given under (e) and (f).

In some cases it is advantageous if a proportion of the polyalkylenepolyamines B employed is replaced by other types of diamines, triamines, tetramines, pentamines or hexamines, for example by amines of the formula

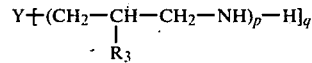

in which
Y represents oxygen, sulphur or the radical of an at least difunctional aliphatic, cycloaliphatic, araliphatic or aromatic compound containing hydroxyl groups and/or sulphhydryl groups,
$R_3$ denotes hydrogen or the methyl group,
p is an integer from at least 1, preferably 1–3, and
q represents an integer from at least 2, preferably 2–4.

Examples of representatives of these polyamines are bis-(3-aminopropyl) ether, bis-(3-aminopropyl) sulphide, ethylene glycol bis-(3-amino-propyl) ether, dithioethylene glycol bis-(3-aminopropyl) ether, neopentylene glycol bis-(3-amino-propyl) ether, hexahydro-p-xylylene glycol bis-(3-aminopropyl) ether and hydroquinone bis-(3-aminopropyl) ether as well as amines of the formula

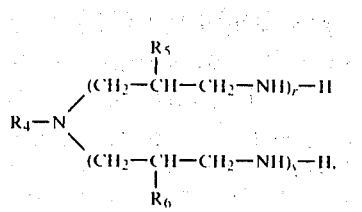

in which

R$_4$ represents a C$_1$–C$_{18}$-alkyl radical which is optionally substituted by an amino or hydroxyl group, R$_5$ and R$_6$ independently of one another represent hydrogen or a methyl group and r and s is a number from 1 to 20, preferably 2 to 5.

Examples of representatives of these polyamines are ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and, above all, methyl-bis-(3-amino-propyl)-amine.

The proportions of the basic polyamides A and the polyalkylenepolyamines B can vary within wide limits in the preparation of the water-soluble polyamines according to the invention. In general, those reaction products which are prepared using the polyamides and the polyethylenepolyamines in a weight ratio of 1 to 10:10 to 1, in particular of 1 to 2.5:2.5 to 1, preferably of 1 to 1.8:1.8 to 1, are to be preferred.

Compounds C which are polyfunctional towards amino groups and are suitable for the preparation of the polyamines according to the invention are, in particular, those polyfunctional compounds which, in aqueous solution at pH values above 6, preferably above 8, are able to react completely with the amino groups contained in the basic polyamides.

Examples which may be mentioned of compounds which are polyfunctional towards amino groups are: bifunctional compounds, such as α,ω-alkyl dihalides, for example, in particular, 1,2-dichloroethane, 1,2-dibromoethane, 1,2-dichloropropane, 1,3-dichloropropane and 1,6-dichlorohexane; ω,ω'-dihalogeno-ethers, for example 2,2'-dichlorodiethyl ether, bis-(β-chloroisopropyl) ether and bis-(4-chloro-butyl) ether; halogenohydrins and epihalogenohydrins, for example epichlorohydrin, 1,3-dichloropropan-2-ol, bis-(3-chloro-2-hydroxypropyl) ether and 1,4dichloro-2,3-epoxybutane; bis-epoxy compounds, for example 1,2,3,4-diepoxybutane, diglycidyl ether, ethane-1,2-bis-glycidyl ether and butane-1,4-bis-glycidyl ether; ω-halogenocarboxylic acid halides, for example chloroacetyl chloride, 2-chloropropionyl chloride, 3-chloropropionyl chloride and 3-bromopropionyl bromide; vinyl compounds, for example divinyl ether, divinyl sulphone and methylene-bis-acrylamide; and furthermore 4-chloromethyl-1,3-dioxolan-2-one and chloroformic acid 2-chloroethyl ester, and also chloroformic acid esters, 3-chloro-2-hydroxypropyl ethers and glycidyl ethers of polyalkylene oxides, for example polyethylene oxides, as well as of reaction products of 1 to 50 mols of alkylene oxides, such as ethylene oxide and/or propylene oxide, with 1 mol of dihydric or polyhydric polyols or of other compounds containing at least two active hydrogen atoms; and trifunctional compounds, such as 1,3,5-triacryloyl-hexahydro-s-triazine.

The proportions of polyfunctional compounds to the two components A and B are appropriately chosen so that the . . . for obtaining the desired degree of condensation of the water-soluble polyamine are not substantially exceeded. The minimum amounts to be used of compounds which are polyfunctional towards amino groups in order to obtain reaction products with the desired high molecular weight or solutions thereof with the required viscosity depend mainly on the molecular weight of the two components and can be easily determined from case to case by preliminary experiments.

0.01–0.5 mol, in particular 0.03–0.40 mol, of the polyfunctional compounds is preferably used per mol of basic nitrogen atom in the basic polyamides and polyalkylenepolyamines.

The polyamines according to the invention can be prepared from the basic polyamides A and the polyalkylene-polyamines B by processes which are in themselves known, for example by a process in which mixtures of A, B and the compounds C which are polyfunctional towards amino groups are stirred in an aqueous medium the poly-values above 6 and at temperatures between 0° and 130° C. until a sample of the reaction mixture has, in the form of a 10% strength aqueous solution, a viscosity of at least 10 cP at 25° C. It is frequently advantageous if the polyfunctional compounds are gradually added in portions to the mixture of A and B in an aqueous medium, under otherwise identical reaction conditions, until the desired viscosity is reached. If the reaction has been carried out using relatively high concentrations, the content of reaction products in the reaction solution, which is preferably between 10 and 30 percent by weight, is adjusted to the desired final value by dilution with water. In some cases, after the required viscosity has been reached, it is necessary to adjust the pH value of the reaction solution to pH 6, preferably to 4 to 5, by adding acids, for example hydrochloric acid, sulphuric acid, phosphoric acid or acetic acid, in order to bring the reaction to completion. This applies, above all in the case where the minimum amount of functional compounds required to obtain the desired degree of condensation of the water-soluble polyamine has been considerably exceeded.

However, it is also possible to carry out the condensation reaction in a closed vessel at temperatures above the boiling point of the compound C which is polyfunctional towards amino groups, preferably between 90° and 130° C. and under pressures at 5 bars, especially if dihalogenoalkanes are used. In this procedure, it is not usually necessary to stop the reaction by adding acid.

The total concentration of the components in the aqueous reaction mixture should be 10 to 50 percent by weight.

It is not absolutely necessary to carry out the reaction of the polyfunctional compound C with a mixture of A and B in the preparation of the reaction products according to the invention. It is also possible to first react one of the two components A or B with the polyfunctional compound C to give a pre-condensate and then to react this with the other component in a second stage.

The polyamines according to the invention are characterised by a minimum molecular weight of 2,500, preferably 5,000. The upper limit of their molecular weight is imposed by the property of being water-soluble. It is not possible to give a numerical figure for the upper limit of their molecular weight, since this greatly depends on the polyamines on which they are based and the number of groups they contain which confer solubility in water.

When using the polyamines according to the invention as auxiliaries for increasing the retention of fibres, fillers and pigments and as drainage accelerators, the procedure followed is in itself known and is to add the polyamines according to the invention, in the form of dilute aqueous solutions, to the paper-pulp suspension before the head box, the metering point being chosen so that good distribution of the auxiliary in the suspension of the raw materials is ensured but too long a contact time is avoided. The amounts of polyamines which are necessary to produce the desired retention action and/or drainage accelerating action can be determined without difficulty by preliminary experiments; in general, it is advisable to use 0.005 to 0.5 percent by weight of polyamines, relative to the dry weight of the paper. Addition of polyamines according to the invention before the head box of the paper machine also has an advantageous effect on the working up of the effluents from the paper machine by filtration, flotation or sedimentation; the coagulating action of the polyamines according to the invention very considerably facilitates the separation of pulp constituents from the effluent from the paper machine.

When the polyamines according to the invention are used as auxiliaries in the working up of effluents from paper machines by filtration, flotation or sedimentation, the procedure which can be followed is also in itself known and is preferably to add the reaction products concerned, in the form of dilute aqueous solutions, to the effluent from the paper machine, appropriately before entry into the save-all.

The amounts of polyamines which effect adequate coagulation of the paper pulp constituents contained in the effluents from paper machines are to be calculated according to the composition of the effluents and can easily be determined from case to case by preliminary experiments; in general, amounts of 0.005 to 2 g of polyamine per m$^3$ of effluent are adequate for this purpose.

In comparison with the known reaction products (I and II) prepared from polyfunctional compounds and either polyamide-amines of polyethylenepolyamines alone, the polyamines according to the invention show an increase in the retention activity and in the drainage acceleration in the application range of pH 4.0–8.0. Whilst the polyamide-amine reaction products I are better in the acid range of about 4–5 than those II prepared from polyethylenepolyamine, the reverse is true in a weakly acid (pH 6.0) to weakly alkaline medium (pH 8.0), and in the alkaline medium the polyethylenepolyamine reaction products are even significantly better. In contrast, the polyamines according to the invention exhibit an activity which in all pH ranges achieve at least the maximum value of the particular better product. This synergistic effect could not be predicted, since even when mixtures of I and II are used only the mean values of the two products, which can be calculated according to the mixing proportions, are achieved.

Some polyamines according to the invention and their use for increasing the retention of fibres, fillers and pigments and for accelerating drainage during the production of paper are described below, by way of example.

The polyamines according to the invention, which have additionally acid groups, are especially suitable for accelerating drainage during the preparation of paper with a high content of wood-pulp in acid medium. In this case they are more effective than the polyamines, which are free from acid groups, and then the acid groups containing polyamines of German Auslegeschrift 2156 215.

PREPARATION EXAMPLES

Preparation of the polyamide-amines (A)

Polyamide-amine 1

108 g (1.05 mols) of diethylenetriamine are mixed with 146 g (1 mol) of adipic acid in a reaction vessel with a gas inlet tube and descending condenser, 9 g (0.05 mol) of adipic acid dihydrazide being added, and the mixture is heated to 190° C. in the course of 3–4 hours, whilst stirring and passing oxygen-free nitrogen over, the reaction temperature in the range from 150°–190° C. being increased at a rate such that the water formed distils off uniformly. After about 30 g of water and small amounts of diethylenetriamine have distilled over, the reaction mixture is stirred at 190°–180° C. under reduced pressure (20–50 mm/Hg) until a total of 44 g of distillate are obtained, and is then cooled to 130° C. and the same amount by weight (219 g) of water is added. The basic polyamide formed is thus obtained in the form of a 50% strength aqueous solution which has a viscosity of 300–400 cP at 25° C. and an equivalent weight of 340.

Polyamide-amine 2

108 g (1.05 mols) of diethylenetriamine, 146 g (1.0 mol) of adipic acid and 28 g (0.25 mol) of ε-caprolactam are reacted as described in the preparation of the polyamide-amine 1, 9 g (0.05 mol) of adipic acid dihydrazide being added, to give the corresponding basic polyamide. The 50% strength polyamide solution obtained on adding the same amount by weight of water has a viscosity of 400–500 cP at 25° C. and an equivalent weight of 400.

Polyamide-amine 3

191 g (1.1 mols) of N,N'-bis-(3-aminopropyl)-ethylenediamine and 146 g (1.0 mol) of adipic acid are heated to 200° C. in the course of 3–4 hours, whilst stirring and passing oxygen-free nitrogen over, the reaction temperature in the range from 150°–200° C. being increased at a rate such that the water formed distils off uniformly. The temperature is then kept at 200° C. for a further 3 hours. Thereafter, the mixture is cooled to about 120° C. and water is then added in an amount such that a 50% strength aqueous solution of the basic polyamide is formed —297 g are necessary for this. The polyamide solution has a viscosity of 722 mPas at 25° C. and an amine equivalent of 274.

Polyamide-amine 4

145 g (1.0 mol) of bis-(3-aminopropyl)-methylamine and 117 g (0.8 mol) of adipic acid are reacted as described in the preparation of the polyamide-amine 1, 2 g (0.01 mol) of adipic acid dihydrazide being added, to give the corresponding basic polyamide. The 50% strength polyamide solution obtained on adding the same amount by weight (221 g) of water has a viscosity of 416 mPas at 25° C. and an equivalent weight of 360.

Polyamide-amine 5

206 g (2.0 mols) of diethylenetriamine and 146 g (1.0 mol) of adipic acid are reacted as described in the preparation of the polyamide-amine 1 to give the corresponding basic polyamide. The 50% strength polyamide solution obtained on adding the same amount by weight (231 g) of water has a viscosity of 165 mPas at 25° C. and an equivalent weight of 248.

Polyamide-amine 6

146 g (1.0 mol) of adipic acid are added, whilst stirring, to 277 g (1.35 mols) of the polyethylenepolyamine mixture mentioned under B/2, having an amine equivalent of 43.7 and an average molecular weight of 205, at a rate such that the temperature rises to 125°–135° C. as a result of the heat of neutralisation. The clear melt of the salt is then heated to 195°–200° C. in the course of 3 hours, whilst passing a weak stream of nitrogen over, and this temperature is maintained for a further 3 hours. The polycondensation reaction is thereby brought to completion, 46 g of water and 1 g of low-boiling polyethylenepolyamines passing over. The reaction product is then cooled to about 130° C. and 376 g of water are added rapidly at this temperature. A clear, yellow 50% strength aqueous solution of the polyamide thereby forms, which has a viscosity of 251 mPas at 25° C. and an amine equivalent weight of 159.

Polyamide-amine 7

To 340 g of the polyamide-amine 1 are added 10 g of acrylic acid (0.14 mols/val) and 15 g of an aqueous solution of potassium hydroxide of a 50% strength. The reaction mixture is stirred for 5 hours at 80° C.

Polyamide-amine 8

To 340 g of the polyamide-amine 1 are added 30 g of acrylic acid (0.42 mols/val) and 47 g of an aqueous solution of potassium hydroxide of a 50% strength. The reaction mixture is stirred for 5 hours at 80° C.

Preparation and composition of the polyalkylenepolyamines (B)

Polyalkylenepolyamine 1

Excess ammonia is first separated off, under pressure, from the reaction mixture obtained by continuously reacting dichloroethane, aqueous ammonia and ethylenediamine in the molar ratio 1:17:0.4 at 160°–220° C. and under 100 bars, and the bases formed are then liberated from their hydrochlorides at 130°–135° C. with excess 50% strength sodium hydroxide solution. Most of the water and of the ethylenediamine thereby distils off, whilst the higher-boiling bases separate out in the liquid form. The base mixture thus obtained contains, in addition to 15–20% of water and 3–5% of ethylenediamine, about 15–20% of diethylenetriamine, 2–3% of aminoethylpiperazine, $\sim$1% of $NH_2$—$CH_2CH_2$—$NHCH_2CH_2$—$OH$, 15–18% of triethylenetetramine, 3–4% of tetraethylenetetramine, 10–14% of tetraethylenepentamine, 6–10% of pentaethylenehexamine and about 10–15% of higher polyethylenepolyamines and small amounts of sodium chloride and sodium hydroxide.

Polyalkylenepolyamine 2

The residual water, ethylenediamine and most of the diethylenetriamine is distilled off, first under normal pressure and then under a reduced pressure of about 100 mbars, from the base mixture obtained according to Example 1 and the sodium chloride which separates out is removed by filtration.

Polyalkylenepolyamine 3

In addition to water, ethylenediamine and diethylenetriamine most of the triethylenetetramine is also separated off by distillation, under a final vacuum of about 10–15 mm Hg, from the base mixture obtained according to Example 1 and the inorganic compounds which separate out are likewise removed by filtration, filtration being facilitated by adding kieselguhr, and it also being possible to considerably brighten the amine mixture by using active charcoal.

Polyalkylenepolyamine 4

450 g of 1,2-dichloroethane are added to a mixture of 180 g of ethylenediamine and 750 g of pentaethylenehexamine in 1,100 ml of water at 80° C. in the course of 3 hours, whilst cooling under reflux, and the mixture is then left at this temperature for a further 1 hour. The 42.3% strength amine solution can then be reacted with polyfunctional compounds, together with the polyamide-amines, without isolating the oligomeric polyethylenepolyamines.

Polyalkylenepolyamines 5

The oligomeric polyalkylenepolyamine mixture is not prepared from the pure polyethylenepolyamines or its mixtures, as is the case in B/4, but from the polyethylenepolyamine mixture B/1 with a water content of 17%. To this mixture B/1 is continuously added 0.35 times the amount by weight of 1,2-dichloroethane under 30 bars and between 60° and 130° C., 0.8 times the amount by weight of water being added. The average molecular weight of the resulting 42.8% strength aqueous solution of the oligomeric polyethylenepolyamine mixture is about 2,300.

Polyalkylenepolyamine 6

Analogously to B/5, the base mixture obtained under B/3 is reacted continuously with 0.3 part of 1,2-dichloroethane, after dilution with 3 parts of water. A 25% strength aqueous solution of an oligomeric polyethylenepolyamine mixture with an average molecular weight of about 1,000 is obtained.

Polyalkylenepolyamine 7

A mixture of 1 part of ethylenediamine and 1 part of water is reacted continuously with 0.4 part of dichloroethane at 60° to 130° C. and under a pressure of 60 bars. Excess 50% strength sodium hydroxide solution is added to the resulting reaction mixture at 135° C., the water and the unreacted ethylenediamine distilling off. The higher-boiling bases, essentially a mixture of triethylenetetramine, pentaethylenehexamine and heptaethyleneoctamine as well as small amounts of even more highly condensed polyethylenepolyamines, are separated off in the liquid form.

Polyalkylenepolyamine 8

The procedure is as for the preparation of B/7, but with the difference that propylene-1,2-diamine is used instead of ethylenediamine.

Polyalkylenepolyamine 9

The procedure is as for the preparation of B/7, but with the difference that a mixture of $NH_2$—$CH_2CH_2$——$CH_2NHCH_2CH_2NH_2 + NH_2CH_2CH_2CH_2$—$NHCH_2CH_2$—$NHCH_2CH_2CH_2NH_2$, which has been obtained by reaction of ethylenediamine with 1.5 mols of acrylonitrile and subsequent hydrogenation, is used instead of ethylenediamine.

Reaction products of polyamide-amines A and polyalkylenepolyamines B with polyfunctional compounds C to give the "polyamines" according to the invention Polyamine 1

(a) 25.5 g of epichlorohydrin are added dropwise to a mixture of 30.7 g of the polyalkylenepolyamine mixture given under B/1, with a water content of 17% and an amine equivalent of 48.6, 50 g of the 50% strength polyamideamine solution described under A/1 and 70 ml of water at 30° C. in the course of 15 minutes, whilst stirring, and the mixture is then warmed to 65°-70° C., whilst stirring. As soon as the solution has a viscosity of 150-200 mPas at this temperature, which is the case after about 2 to 3 hours, 118.8 g of water are added and the mixture is further stirred at 70° C. until the viscosity of the solution increases no further (about 8 hours). The resulting 22.5% strength solution of the polyamine has a viscosity of 526 mPas at 25° C.

(b) If 26.5 g of epichlorohydrin are employed instead of 25.5 g of epichlorohydrin, when the desired viscosity has been reached, the pH must be adjusted to 4–5 with hydrochloric acid in order to obtain a product which is stable on storage.

Polyamine 2

7.7 kg of 1,2-dichloroethane are added to a mixture of 13.5 kg of the 50% strength polyamide-amine solution described under A/1, 12.0 kg of the polyethylenepolyamine mixture given under B/1, with a water content of 17% and an amine equivalent of 48.6, and 25.6 kg of water at a temperature of 87°-93° C., whilst stirring very thoroughly, at a rate such that the temperature range of 87°-93° C. can be maintained, whilst the 1,2-dichloroethane simmers (time ~7 hours). 7.7 kg of 50% strength sodium hydroxide solution are also additionally added during the addition of the 1,2-dichloroethane, and in particular at a rate such that its addition is about half a liter behind that of the 1,2-dichloroethane, also in terms of liters. The viscosity initially increases only very slowly, and more rapidly in the last phase. The polycondensation reaction is discontinued, by adding acid, at the point in time when the viscosity has a value such that, after finishing the polyamine, a viscosity of 350–500 mPas results in a 22.5% strength solution. 12.50 kg of concentrated hydrochloric acid/$H_2O$ = 2:1 are first added rapidly, whilst cooling, and thereafter further concentrated hydrochloric acid is added in an amount such that a pH value of 4.0 is reached—about 3.20 kg. Whilst cooling, the mixture is stirred under reduced pressure (50 mm Hg) for a further 1–2 hours in order to remove unreacted 1,2-dichloroethane. Finally, further water is added in an amount such that a 22.5% strength solution of the polyamine is obtained.

Polyamine 3

A mixture of 30 g of the polyethylenepolyamine mixture given under B/3, with an amine equivalent of 43.7, 40 g of the 50% strength aqueous polyamide-amine solution described under A/1, 125 g of water and 19 g of 1,2-dichloroethane is stirred at 80° to 90° C. in a reaction vessel with a reflux condenser until the viscosity of the reaction solution has risen to about 480 mPas at 85° C. (after about 11 hours). Thereafter, 29.5 g of concentrated hydrochloric acid and 1.1 g of water are added to the solution and the mixture is cooled. The resulting 22.5% strength aqueous solution of the polyamine formed has a pH value of 4.5 and a viscosity of 405 mPas at 25° C.

Polyamine 4

A mixture of 30 g of the polyethylenepolyamine mixture given under B/3, with an amine equivalent of 43.7, 40 g of the 50% strength aqueous polyamide-amine solution described under A/1, 125 g of water and 22.4 g of epichlorohydrin is stirred at 70°-75° C. until the viscosity has risen to about 700 mPas at 70° C. (about 2 to 3 hours). After adding 34.8 g of concentrated hydrochloric acid and 23.8 g of water, a 22.5% strength solution of the polyamine is obtained which has a viscosity of 480 mPas at 25° C. and a pH value of 3.3.

Analogous products which have approximately the same activity as retention agents and drainage accelerators are obtained if the polyfunctional substances which follow are employed instead of epichlorohydrin:

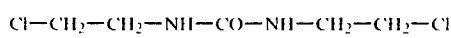

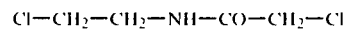

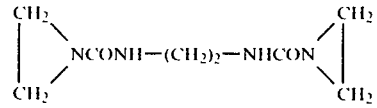

Polyamine 5

A mixture of 30.1 g of the polyethylenepolyamine mixture given under B/1, with a water content of 17% and an amine equivalent of 48.6, 50 g of the 50% strength aqueous polyamide-amine solution described under A/1, 100 g of water and 24.5 g of 1,2-dichloroethane are stirred at 80°-85° C. in a reaction vessel with a reflux condenser until the viscosity of the reaction solution has risen to about 650 mPas at 80° C. (after about 16 hours). Thereafter, the solution is cooled and at the same time adjusted to a pH value of 5.0 with hydrochloric acid, for which 26.3 g of concentrated hydrochloric acid were required. After adding 24.5 g of water, the 22.5% strength polyamine solution obtained has a viscosity of 505 mPas at 25° C.

Polyamine 6

The polyamine is prepared analogously to polyamine 5, from 68 g of polyamide-amine $A_1$, 20.5 g of B/1, 100 g of water and 17 g of 1,2-dichloroethane (reaction time 11 hours). After adding 26.1 g of concentrated hydrochloric acid (pH 4.0) and 19.4 g of water, a 22.5% strength aqueous solution is obtained which has a viscosity of 485 mPas at 25° C.

Polyamine 7

The polyamine is prepared analogously to polyamine 4, from 30 g of the polyethylenepolyamine mixture given under B/2, with an amine equivalent of 43.7, 40 g of the 50% strength aqueous polyamide-amine solution described under A/1, 125 g of water and 26.9 g of epichlorohydrin (reaction time 3–4 hours). After adding 34.9 g of concentrated HCl (pH 3.3) and 37.9 g of water, a 22.5% strength aqueous solution is obtained which has a viscosity of 470 mPas at 25° C.

Products with the same viscosity and activity are obtained if the polyfunctional substances which follow are employed instead of epichlorohydrin: Cl—$CH_2$—CO—NH—$CH_2$—$CH_2$—NH—CO—$CH_2$—Cl, butane-1,4-bis-glycidyl ether and the triglycidyl ether obtained from 1 mol of trimethylolpropane, 10 mols of ethylene oxide and 3 mols of epichlorohydrin.

Polyamine 8

The polyamine is prepared analogously to polyamine 3, from 25 g of the polyethylenepolyamine mixture given under B/2, with an amine equivalent of 43.7, 50 g of the 50% strength aqueous polyamide-amine solution described under A/1, 20 g of 1,2-dichloroethane and 120 ml of water (reaction time about 8–9 hours). After adding 24.5 g of concentrated hydrochloric acid and 6.1 g of water, a 22.5% strength aqueous solution is obtained which has a viscosity of 470 mPas at 25° C. and a pH value of 5.0.

Polyamine 9

The polyamine is prepared analogously to polyamine 5, from 41 g of the polyethylenepolyamine mixture given under B/1, with a water content of 17% and an amine equivalent of 48.6, 34 g of the 50% strength aqueous polyamide-amine solution described under A/1, 35 g of 1,2-dichloroethane and 100 g of water (reaction time 20 hours). After adding 23.6 g of concentrated hydrochloric acid and 33.5 g of water, a 22.5% strength solution with a viscosity of 545 mPas at 25° C. and a pH value of 5.0 is obtained.

Polyamine 10

The polyamine is prepared analogously to polyamine 3, also from 30 g of the polyethylenepolyamine mixture given under B/3, but with 40 g of the 50% strength aqueous polyamide-amine solution described under A/2, 125 g of water and 17 g of 1,2-dichloroethane. After adding 26 g of concentrated hydrochloric acid and 4.2 g of water, a 22.5% strength aqueous solution of the polyamine with a viscosity of 470 mPas at 25° C. and a pH value of 5.0 is obtained.

Polyamine 11

The polyamine is prepared analogously to polyamine 5, also from 30.1 g of the polyethylenepolyamine mixture given under B/1, but with 50 g of the 50% strength aqueous polyamide-amine solution described under A/3, 100 g of water and 22.5 g of 1,2-dichloroethane. After adding concentrated hydrochloric acid until the pH value is 5.0 and water until the polyamine content is 22.5%, the reaction product has a viscosity of 720 mPas at 25° C.

Polyamine 12

The polyamine is prepared analogously to polyamine 11, using polyamide-amine A/4 instead of A/3. Viscosity: 330 mPas/22.5% strength solution/25° C.

Polyamine 13

The polyamine is prepared analogously to polyamine 4, from 30 g of the polyethylenepolyamine mixture given under B/2, with an amine equivalent of 43.7, 40 g of the 50% strength aqueous polyamide-amine solution described under A/5, 125 g of $H_2O$ and 15.0 g of epichlorohydrin (reaction time about 4 hours). After adding concentrated hydrochloric acid until the pH value is 4.5 and water until a 22.5% strength solution of the polyamine is obtained, the product has a viscosity of 435 mPas at 25° C.

Polyamine 14

The polyamine is prepared analogously to polyamine 1 a, using polyamide-amine A/6 instead of A/1. The amounts by weight indicated for 1 a remain in the same order of size Viscosity: 465 mPas/22.5% strength solution/25° C.

Polyamine 15

The polyamine is prepared analogously to polyamine 3, from 114.1 g of the 25% strength aqueous oligomeric polyethylenepolyamine solution described under B/6, 40 g of the 50% strength aqueous polyamide-amine solution described under A/1, 57 g of water, 6 g of 50% strength potassium hydroxide solution and 9.2 g of 1,2-dichloroethane. Viscosity: 455 mPas (22.5% strength solution), pH value 4.5.

Polyamine 16

The polyamine is prepared analogously to polyamine 4, from 75.4 g of the 50% strength aqueous oligomeric polyethylenepolyamine solution described under B/5, 40 g of the 50% strength aqueous polyamide solution described under A/1, 110 g of water and 6.2 g of epichlorohydrin. The reaction time is about 1–2 hours. Viscosity: 465 mPas (22.5% strength solution), pH value 3.3.

Polyamine 17

The polyamine is prepared analogously to polyamine 4, from 25.5 g of pentaethylenehexamine, 50 g of the 50% strength aqueous polyamide-amine solution described under A/1, 125 g of water and 17.3 g of epichlorohydrin. After adding 40.6 g of concentrated hydrochloric acid and 12.7 g of water, a 22.5% strength solution is obtained which has a viscosity of 515 mPas at 25° C. and a pH value of 3.3.

Polyamine 18

The polyamine is prepared analogously to polyamine 4, from 25.5 g of tetraethylenepentamine, 50 g of the 50% strength aqueous polyamide-amine solution described under A/1, 125 g of water and 20.6 g of epichlorohydrin. After adding 27 g of concentrated hydrochloric acid and 31.9 g of water, a 22.5% strength solution with a pH value of 6.6 and a viscosity of 405 mPas at 25° C. is obtained.

Polyamine 19

A mixture of 1.2 kg of the polyethylenepolyamine mixture given under B/1, with a water content of 17% and an amine equivalent of 48.6, 1.35 kg of the 50% strength aqueous polyamide-amine solution described under A/1 and 4.2 kg of water are warmed to 75° C. in a vessel which can be closed, and 1,2-dichloroethane is then added in portions, the vent being closed and whilst stirring well. During this procedure it proves to be advantageous if the dichloroethane is introduced under the surface of the reaction mixture as finely divided as possible, for example by injection. The temperature of the reaction mixture should rise to 115°–120° C. in the course of the reaction. The pH value of the reaction mixture is kept at a value between 7.5 and 8.5 by adding 50% strength sodium hydroxide solution (about 0.80 kg are necessary). When a viscosity of 1,000 mPas, calculated for 25° C., has been reached, the addition of 1,2-dichloroethane is ended—total consumption about 0.79 kg. After a subsequent stirring time of about 30 minutes, the reaction vessel is let down and the reaction mixture is cooled to 60°–70° C. by applying a vacuum of 200–25 mbars. The reaction mixture thus obtained is stable on storage, even without adding acid. When adjusted to 22.5% strength, it has a viscosity of 500 mPas at 25° C.

Polyamine 20

To a mixture of 97 g of the polyethylenepolyamine mixture given under B/1 with a water content of 17% and an amine equivalent of 48.6, 100 g of water and 100 g of the polyamide-amine described under A/7 are added under stirring 70 g of 1,2-dichloroethane and 50 g of a 50% strength aqueous potassium hydroxide solution at 87° to 93° C. The stirring at this temperature is continued until the adjustment to 22.5% strength results in a viscosity of 300 to 600 mPas. Then 50 g of a hydrochloric acid solution of 50% strength is added under cooling. Thereafter hydrochloric acid is added at room temperature until a pH-value of 4.0 is obtained.

Polyamine 21

This polyamine is prepared in accordance with the preparation of polyamine 20 by using
98 g of the polyethylenepolyamine B/1
150 g of the polyamide-amine A/8 and
75 g of 1,2-dichloroethane

EXAMPLE 1

Paper (about 80 g/m$^2$) was produced on a laboratory paper machine (Kämmerer type) from 70% of bleached conifer sulphite pulp and 30% of bleached beech sulphate pulp. The paper was produced on the one hand in the acid range and on the other hand at neutral pH values:

(a) acid range: 30% of China clay, as a filler, 1% of resin size and 3% of aluminium sulphate were added to the paper pulp. The pH value was adjusted to 4.8 with sulphuric acid.

(b) neutral range: 30% of calcium carbonate, as a filler, and 1% of Aquapel 360 XZ (synthetic size based on stearyldiketene, from Messrs. Hercules Inc.) were added to the paper pulp. The pH value was adjusted to 7.8 to 8 with sodium hydroxide solution.

1% strength aqueous solutions of the 22.5% strength polyamines 1 to 19 were metered in, before the head box of the paper machine, by means of a metering pump. For comparison, 1% strength dilutions of the known retention agents polyamide-amine I (I a Example 1, German patent specification No. 1,771,814 and I b Example 1, British patent specification No. 1,035,296) and of the known retention agent polyethylenepolyamine II (Example 1, OS (Published Specification) No. 2,351,754) and mixtures of I a:II in the ratio 75:25%, 50:50% and 25:75% were likewise metered in.

The solids content in the effluent from the paper machine was determined, as a measure of the retention action. The smaller this solids content, the better is the retention action.

Table 1 which follows shows that the polyamines according to the invention have a very good retention action, both in the acid range and in the neutral range, and that this action is better than that obtained when mixtures of polyamide-amine retention agents and polyether-polyamine retention agents are employed. The amounts added relate, in each particular case, to the weight of the air-dried pulp and to the 22.5% strength solution of the retention agent.

TABLE 1

| Retention agent | Amount added [%] | Dry residue in the effluent [mg/l] (a) acid range pH 4.8 | (b) neutral range pH 7.8 |
|---|---|---|---|
| none | | 638 | 793 |
| polyamine 1 | 0.1% | 185 | 180 |
| polyamine 2 | " | 165 | 161 |
| polyamine 3 | " | 191 | 187 |
| polyamine 4 | " | 194 | 190 |
| polyamine 5 | " | 171 | 168 |
| polyamine 6 | " | 188 | 195 |
| polyamine 7 | " | 183 | 176 |
| polyamine 8 | " | 163 | 155 |
| polyamine 9 | " | 180 | 156 |
| polyamine 10 | " | 177 | 173 |
| polyamine 11 | " | 174 | 171 |
| polyamine 12 | " | 168 | 165 |
| polyamine 13 | " | 160 | 151 |
| polyamine 14 | " | 162 | 153 |
| polyamine 15 | " | 157 | 149 |
| polyamine 16 | " | 159 | 150 |
| polyamine 17 | " | 197 | 192 |
| polyamine 18 | " | 198 | 195 |
| polyamine 19 | " | 162 | 156 |
| I a | " | 198 | 392 |
| I b | " | 212 | 433 |
| II | " | 213 | 195 |
| mixture | 75% of Ia 25% of II | 204 | 347 |
| mixture | 50% of Ia 50% of II | 207 | 297 |
| mixture | 25% of Ia 75% of II | 210 | 249 |

EXAMPLE 2

The freeness was determined by the method of Schopper-Riegler as a measure of the drainage acceleration to be expected on a paper machine used in practice. The more the freeness is reduced by the retention agent added, the better is the drainage acceleration to be expected.

Mixed waste paper was pulped with a high-speed stirrer and the pH value was adjusted:

(a) acid range: 0.5% of aluminium sulphate was added and the pH was adjusted to 4.5 with sulphuric acid.

(b) neutral range: the pH was adjusted to 7.2 with sodium hydroxide solution.

To 200 ml of the 1% strength pulp suspension prepared according to (a) or (b), the 1% strength solution was in each case made up to 1,000 ml with water and the freeness was determined with the aid of the Schopper-Riegler apparatus.

The amounts added relate, in each particular case, to the weight of the air-dried pulp and to the 22.5% strength solution of the polyamines 1 to 19.

Table 2 which follows shows the good drainage effect of the polyamines according to the invention, both in the acid and in the neutral range. For comparison, the known retention agents indicated in Example 1 and mixtures thereof were likewise metered in.

TABLE 2

| Drainage accelerator | Amount added [%] | Freeness [°SR] (a) acid range pH 4.5 | (b) neutral range pH 7.3 |
|---|---|---|---|
| none | | 58 | 64 |
| polyamine 1 | 0.4% | 48 | 42 |
| polyamine 2 | " | 47 | 41 |
| polyamine 3 | " | 49 | 42 |
| polyamine 4 | " | 49 | 43 |

TABLE 2-continued

| Drainage accelerator | Amount added [%] | Freeness [°SR] (a) acid range pH 4.5 | (b) neutral range pH 7.3 |
|---|---|---|---|
| polyamine 5 | " | 48 | 42 |
| polyamine 6 | " | 49 | 43 |
| polyamine 7 | " | 48 | 42 |
| polyamine 8 | " | 47 | 40 |
| polyamine 9 | " | 49 | 42 |
| polyamine 10 | " | 48 | 41 |
| polyamine 11 | " | 48 | 41 |
| polyamine 12 | " | 48 | 40 |
| polyamine 13 | " | 46 | 40 |
| polyamine 14 | " | 46 | 40 |
| polyamine 15 | " | 45 | 39 |
| polyamine 16 | " | 45 | 40 |
| polyamine 17 | " | 49 | 42 |
| polyamine 18 | " | 49 | 43 |
| polyamine 19 | " | 47 | 42 |
| Ia | " | 49 | 51 |
| Ib | " | 50 | 52 |
| II | " | 51 | 43 |
| mixture 75% of Ia 25% of II | " | 49 | 49 |
| mixture 50% of Ia 50% of II | " | 50 | 47 |
| mixture 25% of Ia 75% of II | " | 51 | 45 |

EXAMPLE 3

To a mixture of 70 parts of wood-pulp and 30% of a semi-bleached sulphate pulp, which has been pulped with a high speed stirrer is added 40% of China Clay, 0.5% of aluminium sulfate and sulphuric acid until a pH-value of 5.0 is obtained.

In a Schopper-Riegler apparatus was determined the drainage time of a so prepared pulp suspension containing 3 g in 1000 ml of water after a drainage of 700 ml of water. The amounts added relate, in each particular case, to the weight of the air-dried pulp and to the 22.5% strength solution of the polyamines.

Table 3 shows the good drainage effect of polyamines 20 and 21.

TABLE 3

| Drainage accelerator | amount added [%] | time of drainage [sec] |
|---|---|---|
| none |  | 157 |
| polyamine 20 | 0,1 | 110 |
|  | 0,2 | 86 |
|  | 0,4 | 64 |
| polyamine 21 | 0,1 | 105 |
|  | 0,2 | 91 |
|  | 0,4 | 64 |
| polyamine 2 | 0,1 | 127 |
|  | 0,2 | 97 |
|  | 0,4 | 78 |
| polyamine 8 of DE-OS 2156215 | 0,1 | 137 |
|  | 0,2 | 108 |
|  | 0,4 | 89 |

We claim:
1. A water-soluble polyamine, obtained by reacting
(A) at least one water-soluble or water-dispersible basic polyamide which has been prepared by condensation of (a) at least one aliphatic polyamine containing at least two primary amino groups and at least one secondary or tertiary amino group, or of a mixture of such a polyamine and at least one aliphatic, cycloaliphatic, araliphatic or heterocyclic polyamine containing two primary or two secondary amino groups or one primary and one secondary amino group, with (b) an omega amino acid containing at least 3 carbon atoms or a lactam thereof, and (c) at least one saturated aliphatic dicarboxylic acid containing 4–10 carbon atoms, or with an amide-forming functional derivative thereof,

(B) at least one polyalkylenepolyamine of the general formula $$H_2N(-CH_2-CH(-CH_2)_Y-NH)_X H;$$
$$\qquad\qquad |$$
$$\qquad\qquad R$$

in which
R denotes H or $CH_3$,
Y is in each case the same or different and denotes the number 0 or 1 and
x denotes a number from 4 to 2,500,
or a mixture of such a polyalkylenepolyamine with at least one amine of the same general formula, but in which
X denotes a number from 1 to 3, the weight ratio of basic polyamides A to polyalkylenepolyamines B ranging from 1 to 10:10 to 1, and
(C) an alpha, omega,-alkylene dihalide, 0.01–0.5 mol of alkylene dihalide being used per mol of basic nitrogen atom in the basic polyamide and polyalkylenepolyamine.

2. A water-soluble polyamine according to claim 1, wherein virtually all the functional groups of the alkylene dihalide have reacted during the reaction.

3. A water-soluble polyamine according to claim 1, wherein the reaction product of 1 mol of 1,2-dichloroethane with 6 to 30 mols of ammonia, which has been freed from ethylenediamine, is employed as the polyalkylenepolyamine B.

4. A water-soluble polyamine according to claim 3, wherein the reaction product of 1 mol of 1,2-dichloroethane and 6 to 30 mols of ammonia in the presence of 0.1–1 mol of ethylenediamine, is employed as the polyalkylenepolyamine B.

5. A water-soluble polyamine according to claim 1, wherein the reaction product of 1 mol of 1,2-dichloroethane with 6 to 30 mols of ammonia, which has been freed from ethylenediamine and diethylenetriamine, is used as the polyalkylenepolyamine B.

6. A water-soluble polyamine according to claim 5, wherein the reaction product of 1 mol of 1,2-dichloroethane with 6 to 30 mols of ammonia in the presence of 0.1–1 mol of ethylenediamine and diethylenetriamine, is employed as the polyalkylenepolyamine B.

7. A water-soluble polyamine according to claim 1, wherein the amine prepared by condensation of 1,2-dichloroethane with at least one polyethylenepolyamine of the general formula $$H_2N-(-CH_2CH_2NH-)_x-H$$

in which
x denotes a number from 1 to 15, is used as the polyethylenepolyamine B.

8. A water-soluble polyamine according to claim 1, wherein the ratio of (a) to (c) in A is from 0.8–1.4:1.

9. A water-soluble polyamine according to claim 1, wherein 1,2-dichloroethane is used as the alkylene dihalide.

10. A water-soluble polyamine according to claim 1, wherein the basic polyamide A and the polyalkylenepolyamine B are employed in weight ratios of 1 to 2.5:2.5 to 1.

11. A water-soluble polyamine according to claim 1, wherein 0.03–0.40 mol of alkylene dihalide are used per mol of basic nitrogen atom in the basic polyamide and polyalkylenepolyamine.

12. Process for the preparation of a water-soluble polyamine according to claim 1, wherein the reaction of reactants A, B and C is carried out in an aqueous medium at a temperature from 0° to 120° C., at a total concentration of 10–60% and at a pH value above 6.

* * * * *